United States Patent
Xu et al.

(10) Patent No.: US 12,264,105 B2
(45) Date of Patent: Apr. 1, 2025

(54) FULL-FIBER BURNER BRICK AND PREPARATION METHOD THEREOF

(71) Applicant: LUYANG ENERGY-SAVING MATERIALS CO., LTD., Shandong (CN)

(72) Inventors: Meihua Xu, Shandong (CN); Weijin Zheng, Shandong (CN); Deli Ren, Shandong (CN); Cheng Zhang, Shandong (CN); Feng Tang, Shandong (CN); Wei Feng, Shandong (CN)

(73) Assignee: LUYANG ENERGY-SAVING MATERIALS CO., LTD., Shandong (CN)

( * ) Notice: Subject to any disclaimer, the term of this patent is extended or adjusted under 35 U.S.C. 154(b) by 515 days.

(21) Appl. No.: 17/780,561

(22) PCT Filed: Nov. 9, 2021

(86) PCT No.: PCT/CN2021/129448
§ 371 (c)(1),
(2) Date: May 27, 2022

(87) PCT Pub. No.: WO2022/100560
PCT Pub. Date: May 19, 2022

(65) Prior Publication Data
US 2022/0411329 A1  Dec. 29, 2022

(30) Foreign Application Priority Data

Nov. 10, 2020  (CN) .......................... 202011246915.2

(51) Int. Cl.
*C04B 14/06* (2006.01)
*C04B 14/30* (2006.01)
(Continued)

(52) U.S. Cl.
CPC .......... *C04B 28/001* (2013.01); *C04B 14/062* (2013.01); *C04B 14/303* (2013.01); *C04B 14/40* (2013.01); *C04B 14/4625* (2013.01); *C04B 14/48* (2013.01); *C04B 28/005* (2013.01); *C04B 35/117* (2013.01); *C04B 35/62236* (2013.01); *C04B 35/66* (2013.01); *C04B 35/80* (2013.01); *C04B 41/4596* (2013.01);
(Continued)

(58) Field of Classification Search
CPC ... C04B 35/62236; C04B 35/66; C04B 35/80; C04B 41/4596; C04B 2111/00431; C04B 2111/28; C04B 2235/526; C04B 2235/5272; C04B 28/001; C04B 14/062; C04B 14/303; C04B 14/40; C04B 14/4625; C04B 14/48; C04B 28/005; C04B 35/117; C04B 41/5089; C04B 41/5307; C04B 41/81; C04B 35/636; C04B 2111/00551; C04B 2111/2084; C04B 2235/3463; C04B 2235/5216; C04B 2235/5224; C04B 2235/5454; C04B 2235/5472; C04B 28/24; C04B 28/34; C04B 35/18; C04B 35/6263; C04B 2235/3217; C04B 2235/444; C04B 2235/5264; C04B 35/6303; C04B 35/6306; C04B 35/6316; C04B 41/009; C04B 41/5076; C04B 41/5092; C04B 41/67; C04B 41/68; C04B 2235/3418; C04B 2235/522; C04B 2235/524; C04B 2235/9607; C04B 41/5031; C04B 41/5035; C04B 14/06; C04B 14/30; C04B 14/46; C04B 14/38; C04B 28/00; C04B 41/53; C04B 2235/54; C04B 2235/50; C04B 2235/02; C04B 35/10; C04B 35/01; C04B 35/6309; C04B 2103/008; C04B 24/383; Y02P 10/143; F27D 1/04; B28B 11/04

See application file for complete search history.

(56) References Cited

U.S. PATENT DOCUMENTS

| | | | |
|---|---|---|---|
| 4,269,887 A * | 5/1981 | Sonobe | D04H 1/4209 162/149 |
| 6,090,315 A * | 7/2000 | Bai | C09K 21/02 252/604 |

FOREIGN PATENT DOCUMENTS

| | | |
|---|---|---|
| CN | 200946985 Y | 9/2007 |
| CN | 101182222 A | 5/2008 |

(Continued)

OTHER PUBLICATIONS

JP H05117047 A, machine translation (Year: 1993).*
(Continued)

*Primary Examiner* — Bryan D. Ripa
*Assistant Examiner* — Marites A Guino-O Uzzle
(74) *Attorney, Agent, or Firm* — Yue (Robert) Xu; Apex Attorneys at Law, LLP

(57) ABSTRACT

A full-fiber burner brick and a preparation method thereof, comprising mixing alumina crystal fiber and amorphous ceramic fiber with both of them being a combination of fibers of different lengths gradations, and moreover adding fine powder fillers of different particle size gradations and supplementing other additives. This enables the internal structure of the product more uniform, increases the bulk density of the product, and also benefits the suction filterability of fiber cotton blank, and is conducive to forming and improving the strength of the blank. The surface of the brick body is further provided with a coating, which can effectively protect the cotton fiber of the brick body fiber from harsh environments, improve its high temperature resistance, and help to extend the service life of the burner brick.

8 Claims, No Drawings

(51) Int. Cl.
*C04B 14/40* (2006.01)
*C04B 14/46* (2006.01)
*C04B 14/48* (2006.01)
*C04B 28/00* (2006.01)
*C04B 35/117* (2006.01)
*C04B 35/622* (2006.01)
*C04B 35/66* (2006.01)
*C04B 35/80* (2006.01)
*C04B 41/45* (2006.01)
*C04B 41/50* (2006.01)
*C04B 41/53* (2006.01)
*C04B 41/81* (2006.01)
*C04B 35/636* (2006.01)
*C04B 111/00* (2006.01)
*C04B 111/20* (2006.01)
*C04B 111/28* (2006.01)

(52) U.S. Cl.
CPC ...... *C04B 41/5089* (2013.01); *C04B 41/5307* (2013.01); *C04B 41/81* (2013.01); *C04B 35/636* (2013.01); *C04B 2111/00431* (2013.01); *C04B 2111/00551* (2013.01); *C04B 2111/2084* (2013.01); *C04B 2111/28* (2013.01); *C04B 2235/3463* (2013.01); *C04B 2235/5216* (2013.01); *C04B 2235/5224* (2013.01); *C04B 2235/526* (2013.01); *C04B 2235/5272* (2013.01); *C04B 2235/5454* (2013.01); *C04B 2235/5472* (2013.01)

(56) References Cited

FOREIGN PATENT DOCUMENTS

| | | | | | |
|---|---|---|---|---|---|
| CN | 105387720 A | | 3/2016 | | |
| CN | 105565835 A | | 5/2016 | | |
| CN | 105948634 A | * | 9/2016 | ............. | C04B 28/04 |
| CN | 106220194 A | | 12/2016 | | |
| CN | 108033756 A | * | 5/2018 | ............. | C04B 28/24 |
| CN | 108046664 A | | 5/2018 | | |
| CN | 108842506 A | | 11/2018 | | |
| CN | 109054467 A | * | 12/2018 | | |
| CN | 110563476 A | | 12/2019 | | |
| CN | 112321311 A | | 2/2021 | | |
| JP | H05117047 A | * | 5/1993 | | |
| JP | H0674660 A | * | 3/1994 | | |
| JP | H0649627 B2 | | 6/1994 | | |
| JP | H10139561 A | * | 5/1998 | | |
| RU | 2436751 C2 | | 12/2011 | | |
| RU | 2539056 C1 | | 1/2015 | | |
| WO | WO-2019163195 A1 | * | 8/2019 | | |

OTHER PUBLICATIONS

JP H10139561 A, machine translation (Year: 1998).*
CN-108033756-A, machine translation (Year: 2018).*
WO-2019163195-A1, machine translation (Year: 2019).*
CN-109054467-A, machine translation (Year: 2018).*
JP-H0674660-A, machine translation (Year: 1994).*
CN-105948634-A, machine translation (Year: 2016).*
First Office Action dated Nov. 7, 2022 for Russian patent application No. 2022113680.
Search Report dated Dec. 23, 2022 for European patent application No. 21870522.6.
International Search Report for PCT/CN2021/129448 dated Dec. 30, 2021, ISA/CN.
First Office Action dated Apr. 24, 2023 for Japanese patent application No. 2022-527213, English translation provided by Global Dossier.

* cited by examiner

FULL-FIBER BURNER BRICK AND PREPARATION METHOD THEREOF

This application is the national phase of International Application No. PCT/CN2021/129448, titled "FULL-FIBER BURNER BRICK AND PREPARATION METHOD THEREOF", filed on Nov. 9, 2021, which claims the priority to Chinese Patent Application No. 202011246915.2, titled "FULL-FIBER BURNER BRICK AND PREPARATION METHOD THEREOF", filed on Nov. 10, 2020 with the China National Intellectual Property Administration, which is incorporated herein by reference in entirety.

FIELD

The present disclosure relates to the field of refractory materials, and in particular relates to a full-fiber burner brick and a preparation method thereof.

BACKGROUND

At present, the ethylene cracking furnace in the petrochemical industry needs to use burners in three parts: bottom firing, side firing, and top firing. Most of the burner bricks used are made of corundum and heavy castable materials. Although the burner bricks of the above two materials have high strength and can withstand the strong flushing under the high temperature of the natural gas burner in the ethylene cracking furnace, the heavy castable also has many shortcomings, which are summarized as follows:

(1) The bulk density is large. The weight of a set of heavy burner bricks is 270~300 kg/set, which increases the load-bearing pressure of the furnace lining, and especially for the burner bricks at the top firing position, it is very difficult to anchor and require pallets, support plates, and guard plates, which is estimated to be 18 kg/set.

(2) Due to the high weight, it needs to be installed in pieces, and is extremely difficult to hoist and requires at least 3 people to install at the same time. The installation space is small and the operation is very difficult.

(3) It is not resistant to thermal shock. The burner is apt to crack, and the high-density material is ready to fall and hurt people.

(4) The thermal conductivity is high, which leads to high temperature at the burner on the outer wall of the furnace.

In order to solve the above problems, the use of full-fiber burner brick is advocated in the industry. The full-fiber burner brick is light in bulk density, 70~100 kg/set, and easy to install, with only six corner angle steel required, which is estimated to be 3 kg/set, and two people can complete all the installation work. The full-fiber burner brick has low thermal conductivity and good thermal shock. Besides, it is energy saving and has a long service life. However, the existing full-fiber burner brick still has the following problems: the strength of the blank required for high-temperature scouring of the burner gas cannot be reached, the wet blank has poor suction filterability performance, the service life is short, etc.

SUMMARY

In view of this, the purpose of the present disclosure is to provide a full-fiber burner brick and a preparation method thereof. The burner brick provided by the present disclosure can improve the strength and high-temperature resistance, and is beneficial to increase the service life.

The present disclosure provides a full-fiber burner brick, comprising a full-fiber brick body and a coating coated on surface of the full-fiber brick body;

the full-fiber brick body is prepared from a raw material including the following components in mass ratio:

| alumina crystal fiber | 20%~50%; |
|---|---|
| amorphous ceramic fiber | 5%~20%; |
| fine powder filler | 20%~50%; |
| inorganic binder | 30%~50%; |
| organic binder | 5%~15%; |
| flocculant | 1%~5%; | the alumina crystal fiber is composed of a combination of fibers of different lengths, and mass ratio of the fibers of different lengths in the alumina crystal fiber is:

| 0.01 mm ≤ length < 0.05 mm | 25%~35%; |
|---|---|
| 0.05 mm ≤ length < 0.1 mm | 35%~45%; |
| 0.1 mm ≤ length < 1 mm | 25%~35%; | the amorphous ceramic fiber is composed of a combination of fibers of different lengths, and mass ratio of the fibers of different lengths in the amorphous ceramic fiber is:

| 0.01 mm ≤ length < 0.05 mm | 25%~35%; |
|---|---|
| 0.05 mm ≤ length < 0.1 mm | 35%~45%; |
| 0.1 mm ≤ length < 1 mm | 25%~35%. |

Preferably, the fine powder filler is alumina fine powder; the fine powder filler is composed of particles of different particle sizes, and mass ratio of the fine powder filler of different particle sizes in the raw material is:

| 200~325 mesh filler | 10%~20%; |
|---|---|
| 1000 mesh filler | 10%~30%. |

Preferably, the inorganic binder is silica sol and/or aluminum sol;

The organic binder is starch.

Preferably, the flocculant is polyaluminum chloride;
a thickness of the full-fiber brick body is 250~550 mm;
a thickness of the coating is 5~10 mm.

Preferably, the coating is formed by a paint comprising the following components in mass ratio:

| high-temperature resistant inorganic fiber | 10%~50%; |
|---|---|
| reinforcing filler | 10%~20%; |
| high-temperature expansion filler | 5%~15%; |
| skeleton filler | 7%~30%; |
| nanopowder | 3%~10%; |
| inorganic suspending agent | 0%~20%; |
| inorganic binder | 10%~50%; |
| organic additive | 3%~15%; | and water accounting for 10%~50% of a total mass of all the above components;

a length of the high-temperature resistant inorganic fiber is 0.01~1 mm.

Preferably, in the coating:
the nanopowder is selected from one or more of nano silica and nano alumina powder;

the high-temperature resistant inorganic fiber is selected from one or more of high-aluminum fiber, zirconium-containing fiber and alumina crystal fiber.

Preferably, in the coating:

the reinforcing filler is selected from one or more of acicular microsilica powder and pyrophyllite powder;

the high-temperature expansion filler is selected from one or more of kyanite powder and sillimanite;

the skeleton filler is selected from one or more of alumina powder, mullite powder, zircon powder and corundum powder.

Preferably, in the coating:

the inorganic suspending agent is bentonite;

the inorganic binder is selected from one or more of aluminum sol, aluminum dihydrogen phosphate and silica sol;

the organic additive is selected from one or more of an organic binder, an antiseptic and an antifreeze agent.

The present disclosure also provides a method for preparing the full-fiber burner brick described in the above technical solutions, comprising:

a) mixing alumina crystal fiber, amorphous ceramic fiber, inorganic binder, fine powder filler, organic binder and water to obtain a slurry;

b) mixing the slurry with flocculant, and then performing vacuum suction filtration and pressing to obtain a wet blank;

c) drying the wet blank to obtain a dry blank; and d) applying paint to surface of the dry blank and drying to obtain a full-fiber burner brick.

Preferably, in the step a), a mass concentration of the slurry is 1%~15%; in the step c), the pressing is such that a thickness of a blank reaches 250~550 mm.

The present disclosure provides a full-fiber burner brick, which is prepared by mixing alumina crystal fiber and amorphous ceramic fiber with both of them being a combination of fibers of different lengths gradations, and moreover adding fine powder fillers of different particle size gradations and supplementing other additives. This enables the internal structure of the product more uniform, increases the bulk density of the product, and also benefits the suction filterability of fiber cotton blank, and is conducive to forming and improving the strength of the blank. The surface of the brick body is further provided with a coating, which can effectively protect the cotton fiber of the brick body fiber from harsh environments, improve its high temperature resistance, and help to extend the service life of the burner brick.

The experimental results show that the rupture strength at room temperature of the burner brick provided by the present disclosure reaches above 1.1 MPa, the compressive strength at room temperature reaches above 0.6 MPa, the compressive strength at high temperature reaches above 0.7 MPa, and the absolute value of the heating linear variable is below 0.8%.

DETAILED DESCRIPTION

The present disclosure provides a full-fiber burner brick, comprising a full-fiber brick body and a coating coated on surface of the full-fiber brick body;

the full-fiber brick body is prepared from a raw material including the following components in mass ratio:

| | |
|---|---|
| alumina crystal fiber | 20%~50%; |
| amorphous ceramic fiber | 5%~20%; |
| fine powder filler | 20%~50%; |
| inorganic binder | 30%~50%; |
| organic binder | 5%~15%; |
| flocculant | 1%~5%; | the alumina crystal fiber is composed of a combination of fibers of different lengths, and mass ratio of the fibers of different lengths in the alumina crystal fiber is:

| | |
|---|---|
| 0.01 mm ≤ length < 0.05 mm | 25%~35%; |
| 0.05 mm ≤ length < 0.1 mm | 35%~45%; |
| 0.1 mm ≤ length < 1 mm | 25%~35%; | the amorphous ceramic fiber is composed of a combination of fibers of different lengths, and mass ratio of the fibers of different lengths in the amorphous ceramic fiber is:

| | |
|---|---|
| 0.01 mm ≤ length < 0.05 mm | 25%~35%; |
| 0.05 mm ≤ length < 0.1 mm | 35%~45%; |
| 0.1 mm ≤ length < 1 mm | 25%~35%; |

In the present disclosure, the sum of the mass ratios of the above components is preferably 100%.

The present disclosure mixes alumina crystal fiber and amorphous ceramic fiber with both of them being a combination of fibers of different lengths gradations, and moreover adds fine powder fillers of different particle size gradations and supplements other additives. This enables the internal structure of the product more uniform, increases the bulk density of the product, and also benefits the suction filterability of fiber cotton blank, and is conducive to forming and improving the strength of the blank. The surface of the brick body is further provided with a coating, which can effectively protect the cotton fiber of the brick body fiber from harsh environments, improve its high temperature resistance, and help extend the service life of the burner brick.

As for the Full-Fiber Brick Body of the Burner Brick:

In the present disclosure, the alumina crystal fiber raw material is processed to a specific length in advance, and fibers of different lengths are combined. That is, the alumina crystal fiber is composed of a combination of fibers of different lengths, and mass ratio of the fibers of different lengths in the alumina crystal fiber is:

| | |
|---|---|
| 0.01 mm ≤ length < 0.05 mm | 25%~35%; |
| 0.05 mm ≤ length < 0.1 mm | 35%~45%; |
| 0.1 mm ≤ length < 1 mm | 25%~35%. |

In some embodiments of the present disclosure, the combination of the alumina crystal fibers is as follows:

| | |
|---|---|
| 0.01 mm ≤ length < 0.05 mm | 30%; |
| 0.05 mm ≤ length < 0.1 mm | 40%; |
| 0.1 mm ≤ length < 1 mm | 30%. |

In the present disclosure, the alumina crystal fiber is preferably one or more of 72 alumina crystal fiber, 80 alumina crystal fiber and 95 alumina crystal fiber. In the present disclosure, the mass ratio of the alumina crystal fiber in the raw material is 20%~50%; in some embodiments of the present disclosure, the mass ratio is 20%, 25% or 30%.

In the present disclosure, the amorphous ceramic fiber raw material is processed to a specific length in advance, and fibers of different lengths are combined. That is, the amorphous ceramic fiber is composed of a combination of fibers of different lengths, and mass ratio of the fibers of different lengths in the amorphous ceramic fiber is:

| | |
|---|---|
| 0.01 mm ≤ length < 0.05 mm | 25%~35%; |
| 0.05 mm ≤ length < 0.1 mm | 35%~45%; |
| 0.1 mm ≤ length < 1 mm | 25%~35%. |

In some embodiments of the present disclosure, the combination of the amorphous ceramic fibers is as follows:

| | |
|---|---|
| 0.01 mm ≤ length < 0.05 mm | 30%; |
| 0.05 mm ≤ length < 0.1 mm | 40%; |
| 0.1 mm ≤ length < 1 mm | 30%. |

In the present disclosure, the raw material of the amorphous ceramic fiber is preferably high-aluminum blown fiber cotton, that is, the high-aluminum blown fiber cotton is processed into fibers of different lengths for combination. In the present disclosure, the mass ratio of the amorphous ceramic fiber in the raw material is 5%~20%; in some embodiments of the present disclosure, the mass ratio is 5%, 10% or 20%.

In the present disclosure, the fine powder filler is preferably alumina fine powder. In the present disclosure, the mass ratio of the fine powder filler in the raw material of the full-fiber brick body is 20%~50%; in some embodiments of the present disclosure, the mass ratio is 20% or 25%.

In the present disclosure, the fine powder filler is composed of particles of different particle sizes, and mass ratio of the fine powder filler of different particle sizes in the raw material of the full-fiber brick body is preferably:

| | |
|---|---|
| 200~325 mesh filler | 10%~20%; |
| 1000 mesh filler | 10%~30%. |

In the present disclosure, the inorganic binder is preferably silica sol and/or aluminum sol. In the present disclosure, the mass ratio of the inorganic binder in the raw material of the full-fiber brick body is 30%~50%; in some embodiments of the present disclosure, the mass ratio is 30%, 35% or 40%.

In the present disclosure, the organic binder is preferably starch. In the present disclosure, the mass ratio of the starch in the raw material of the full-fiber brick body is 5%~15%; in some embodiments of the present disclosure, the mass ratio is 5%, 6%, 7% or 8%.

In the present disclosure, the flocculant is preferably polyaluminum chloride. In the present disclosure, the mass ratio of the flocculant in the raw material of the full-fiber brick body is 1%~5%; in some embodiments of the present disclosure, the mass ratio is 2%, 3%, 4% or 5%.

As for the Surface Coating of the Burner Brick:

In addition to the full-fiber brick body, the full-fiber burner brick provided by the present disclosure also has a coating on its surface. In the present disclosure, the coating is formed by a paint comprising the following components in mass ratio:

| | |
|---|---|
| high-temperature resistant inorganic fiber | 10%~50%; |
| reinforcing filler | 10%~20%; |
| high-temperature expansion filler | 5%~15%; |
| skeleton filler | 7%~30%; |
| nanopowder | 3%~10%; |
| inorganic suspending agent | 0%~20%; |
| inorganic binder | 10%~50%; |
| organic additive | 5%~15%; | and
water accounting for 10%~50% of a total mass of all the above components;

a length of the high-temperature resistant inorganic fiber is 0.01~1 mm.

The high-temperature nano-composite paint provided by the present disclosure is prepared by performing pretreatment on fiber to control the fiber length, and introducing high-temperature reinforcing filler, high-temperature expansion filler, nanopowder, inorganic suspending agent, and other additives. Through these improvements, the obtained high-temperature nano-composite structure paint has the following characteristics: (1) It has ultra-high strength and compactness at high temperature, small shrinkage, no cracks generated at high temperature, and can withstand the super-strong scouring of airflow and the erosion of atmosphere of the cracking furnace in the petrochemical industry; (2) The introduction of nanopowder makes the particle size gradation of the paint more abundant and the permeability stronger when sprayed on the surface of the fiber lining, thereby achieving the purpose of a stronger bonding to the fiber lining; (3) Through the gradation control of fiber length and powder particle size and the introduction of an inorganic suspending agent and other additives, the paint is uniform and stable, delicate and smooth, and can reach a slurry flow state similar to toothpaste when extruded, avoiding precipitation and stratification during the placement process. Small packaging can be realized, and an inverted hammer shape can be formed when anchoring and rooting at the bottom of the fiber module; (4) The paint has good permeability, good bonding to the furnace lining after spraying, and special anchoring and rooting performance, which makes the bonding of the paint and the furnace lining dually firm, effectively resisting airflow scouring and prolonging the service life of the furnace lining.

In the present disclosure, the raw material of the high-temperature resistant inorganic fiber is preferably one or more of high-alumina fiber, zirconium-containing fiber and alumina crystal fiber. Among them, the alumina crystal fiber is preferably one or more of 72 alumina crystal fiber, 80 alumina crystal fiber and 95 alumina crystal fiber.

In the present disclosure, the high-temperature resistant inorganic fiber is secondary processed fiber, and the present disclosure controls the length of the fiber through processing. In the present disclosure, the length of the obtained high-temperature resistant inorganic fiber is 0.01~1 mm; and the diameter of the high-temperature resistant inorganic fiber is preferably 1~6 um.

In the present disclosure, the mass percentage of the high-temperature resistant inorganic fiber in the paint is 10%~50%, preferably 15%~30%; in some embodiments of the present disclosure, the mass ratio is 15%, 20%, 25% or 30%.

In the present disclosure, the reinforcing filler is a high-temperature resistant reinforcing filler, preferably one or more of acicular microsilica powder and pyrophyllite powder. Among them, the aspect ratio of the acicular microsilica powder is preferably (15~20):1. The particle size of the pyrophyllite powder is preferably 200~300 mesh. In the present disclosure, there is no special restriction on the source of the high-temperature reinforcing filler, as long as it is a general commercial product.

In the present disclosure, the mass percentage of the reinforcing filler in the paint is 10%~20%; in some embodiments of the present disclosure, the mass ratio is 10%, 13%, 15% or 20%.

In the present disclosure, the high-temperature expansion filler is preferably one or more of kyanite powder and sillimanite. In the present disclosure, there is no special restriction on the source of the high-temperature expansion filler, as long as it is a general commercial product. In the present disclosure, the mass percentage of the high-temperature expansion filler in the paint is 5%~15%; in some embodiments of the present disclosure, the mass ratio is 5%, 8% or 12%.

In the present disclosure, the skeleton filler is a high-temperature resistant skeleton filler, preferably one or more of alumina powder, mullite powder, zircon powder and corundum powder. In the present disclosure, the particle size of the framework filler is preferably 300-1000 mesh. In the present disclosure, there is no special restriction on the source of the skeleton filler, as long as it is a general commercial product.

In the present disclosure, the mass percentage of the skeleton filler in the paint is 7%~30%; in some embodiments of the present disclosure, the mass ratio is 7%, 10% or 15%.

In the present disclosure, the nanopowder is preferably one or more of nano silica and nano alumina powder. In the present disclosure, the particle size of the nanopowder is preferably 1~100 nm. In the present disclosure, there is no special restriction on the source of the nanopowder, as long as it is a general commercial product.

In the present disclosure, the mass percentage of the nanopowder in the paint is 3%~10%; in some embodiments of the present disclosure, the mass ratio is 3%, 5% or 8%.

In the present disclosure, the inorganic suspending agent is preferably bentonite. In the present disclosure, the mass percentage of the inorganic suspending agent in the paint is 0%~20%; in some embodiments of the present disclosure, the mass ratio is 0% or 5%.

In the present disclosure, the inorganic binder is preferably one or more of aluminum sol, aluminum dihydrogen phosphate and silica sol. In the present disclosure, the mass percentage of the inorganic binder in the paint is 10%~50%; in some embodiments of the present disclosure, the mass ratio is 25%, 37%, 40% or 41%.

In the present disclosure, the organic additive is preferably one or more of an organic binder, an antiseptic and an antifreeze agent; more preferably, the organic additive is an organic binder, an antiseptic and an antifreeze agent. Among them, the organic binding agent is preferably one or more of starch, dextrin and cellulose. The antiseptic is preferably Biocide. The antifreeze agent is preferably ethylene glycol.

In the present disclosure, the mass percentage of the organic additive in the paint is 3%~15%; in some embodiments of the present disclosure, the mass ratio is 3% or 5%.

In the present disclosure, the total mass of the above high-temperature resistant inorganic fiber, reinforcing filler, high-temperature expansion filler, skeleton filler, nanopowder, inorganic suspending agent, inorganic binder and organic additive is preferably 100%. In addition to the above components, the paint system comprises water; in the present disclosure, the amount of water is 10%-50% of the total amount of all the above components except water; in some embodiments of the present disclosure, the amount of water is 15%, 25%, 30% or 35%.

The high-temperature nano-composite paint provided by the present disclosure adopts fibers of a specific length, and introduces a specific reinforcing filler and a high-temperature expansion filler, so that it has ultra-high strength at high temperature and avoids cracks caused by shrinkage at high-temperature. In addition, certain skeleton filler and nano-structured materials are introduced, and the synergistic effect between the above materials makes the paint state uniform and stable, avoiding precipitation and stratification during the placement process. During high-temperature use, the paint is firmly bonded to the furnace lining, has small high-temperature shrinkage, and has hard crust barrier with ultra-high strength. The paint has small shrinkage after high temperature firing and no cracks, and is firmly bonded to the furnace lining, and has high strength after high temperature firing, which can effectively withstand the scouring of airflow and the erosion of atmosphere of bottom firing, side firing and top firing, thereby protecting the fiber module from being corroded by the external environment and being brittle due to disintegration, and preventing the heat loss of the furnace during high-temperature operation, so as to prolong the service life of the furnace lining and reduce the temperature of the outer wall of the furnace, achieving the purpose of energy saving and consumption reduction. The high-temperature nano-composite paint provided by the present disclosure can be used as a special paint for the full-fiber structure of an ethylene cracking furnace, and has ultra-high strength, strong bonding to the fiber lining and a special anchoring state, thereby realizing the convenience of construction and playing a key role in the application of replacing the brick wall with the full-fiber structure.

In the present disclosure, the above-mentioned paint can be prepared by the following method:

S1. mixing high-temperature resistant inorganic fiber, inorganic binder and water to obtain a fiber dispersion;

S2. mixing the fiber dispersion with high-temperature expansion filler, reinforcing filler and skeleton filler to obtain a slurry; and S3. mixing the slurry with nanopowder, inorganic suspending agent and organic additive to obtain a paint.

Among them, in step S1, the mixing is preferably mixing under stirring; the stirring time is preferably 10~30 min. In step S2, the mixing is preferably mixing under stirring; the stirring time is preferably 3~5 min. In step S3, the mixing sequence is preferably: first adding the nanopowder to the slurry, mixing for 3~5 min under stirring; then adding the inorganic suspending agent, mixing for 5~10 min under stirring; finally adding the organic additive, mixing for 10~20 min under stirring, to obtain a coating.

In the full-fiber burner brick provided by the present disclosure, a thickness of the full-fiber brick body is preferably 250~550 mm; a thickness of the coating is preferably 5~10 mm. In the present disclosure, the coating is coated on all outer surfaces of the full-fiber brick body.

The present disclosure also provides a method for preparing the full-fiber burner brick described in the above technical solutions, comprising:

a) mixing alumina crystal fiber, amorphous ceramic fiber, inorganic binder, fine powder filler, organic binder and water to obtain a slurry;

b) mixing the slurry with flocculant, and then performing vacuum suction filtration and pressing to obtain a wet blank;

c) drying the wet blank to obtain a dry blank; and d) applying paint to surface of the dry blank and drying to obtain a full-fiber burner brick.

Regarding step a):

In the present disclosure, fibers are preprocessed on a blending willow to control the length of the fibers, and then the fibers are combined with different lengths and put into the raw material for use. Among them, the types and lengths of the alumina crystal fiber and the amorphous ceramic fiber, and the ratio of the fibers of different lengths, etc. are consistent with those described in the above technical solutions, and will not be repeated here. Among them, the types and amounts of the inorganic binder and the fine powder filler are consistent with those described in the above technical solutions, and will not be repeated here.

Because the volume of the burner brick is relatively large, the forming thickness is more than 450 mm, and it is difficult to increase the thickness of the suction filtration when it is sucked to be half thick, so the normal suction filtration is inaccessible to achieve the effect. The present disclosure has adjusted the gradation of fiber length and powder strength, and increases the suction filterability of cotton pulp. Before the fiber is wet-formed, it is pre-processed to the specified length range. The fiber length is controlled, so that the fiber length has a specific gradation, which solves the problem that it is difficult to control the fiber length when stirring the fiber in water, resulting in the cotton pulp being too fine to be suction filtered, or being too thick to lead to uneven suction filtration as well as uneven internal structure of the cotton blank due to the too small bulk density of the cotton blank during the forming process. The particle gradation of the powder filler is controlled, which also helps the cotton blank to form better when the wet blank is suction filtered.

In the present disclosure, when the above materials are mixed, the mixing sequence is preferably: alumina crystal fiber, amorphous ceramic fiber, inorganic binder, fine powder filler and organic binder are sequentially added to water in proportions and mixed uniformly. The present disclosure has no special restrictions on the mixing method, as long as the materials are mixed in a conventional mixing method well known to those skilled in the art. In the present disclosure, it is preferable to control the mass concentration of the slurry obtained by mixing to 1%~15%.

Regarding step b):

In the present disclosure, the slurry obtained in step a) is mixed with flocculant to aid filtration. After adding flocculant to the slurry, the fiber, fine powder filler and inorganic binder are flocculated together to make the water clear. In the present disclosure, the temperature at which the flocculant is added for flocculation is preferably 5~40° C., and the time is preferably 1~5 min. The flocculated slurry is placed into the forming tank, and then vacuum suction filtration is performed to remove excess liquid. After the above suction filtration forming, a wet blank is obtained. In the above suction filtration forming, the present disclosure is different from the prior art in the forming die. In the traditional forming method, the material can only be fed from above for forming, whereas the present disclosure adds side suction, which makes the product blank more uniform and compact.

In the present disclosure, a pressing process is added during the forming process to increase the thickness of the forming die. After the cotton pulp fills the forming die, in the final drying process, the pressing process is added, and the wet blank is pressed while being suction filtered, so that the wet blank is more compact and uniform, ensuring the bulk density and strength of the cotton blank.

Regarding step c):

In the present disclosure, the drying temperature is preferably 80~120° C., and the drying time is preferably 30~120 h. After drying, a dry blank is obtained.

Regarding step d):

In the present disclosure, the method of applying paint preferably comprises: first punching holes on the surface of the dry blank, gluing into the holes for rooting of the paint, and then applying paint to the entire surface of the dry blank. The present disclosure has no special restrictions on the operations of punching and rooting of the paint, as long as they are carried out in accordance with the conventional operations in the field. Taking a rectangular burner brick (length 500 mm×width 500 mm×height 320 mm) as an example, it includes six surfaces, up, down, left, right, front and back. Punching holes can be performed particularly on the surface of the fire-facing and side walls, along the vertical direction of the fire-facing surface and the side walls. Starting from the edge of the fire-facing surface, punching is started from 50 mm square, with a hole every 80 mm, 5 holes per row, 5 rows, a total of 35 holes. The side wall is also punched by this method, with about 24 holes per side, a total of four sides, evenly distributed along the brick body. The punching diameter is 10 mm, and the punching depth is 2050 mm. After punching holes, gluing is performed into the hole for the rooting of the paint. The paint is the paint described in the above technical solution, and will not be repeated here. After that, paint is applied to the surface of the dry blank and dried to form a coating. In the present disclosure, the drying temperature is preferably 80~120° C., and the drying time is preferably 10~48 h; the thickness of the formed coating is preferably 5~10 mm. After the above treatment, a full-fiber burner brick is obtained.

Traditional high-temperature full-fiber special-shaped products use surface sizing with inorganic binder on the surface to increase the strength of the cotton blank, which cannot fundamentally protect the cotton blank fiber from harsh environment. However, the surface coating fundamentally isolates the contact between the harsh external environment and the full-fiber blank, thereby greatly extending the service life of the burner brick.

The full-fiber burner brick provided by the present disclosure has the following beneficial effects: the combination of brick body materials can increase the bulk density of the product and improve the suction filterability of the fiber cotton blank, and is conducive to forming and improving the strength of the blank. The surface of the brick body is further provided with a coating, which can effectively protect the cotton fiber of the brick body fiber from harsh environments, improve its high temperature resistance, and help to extend the service life of the burner brick when used as a burner brick for ethylene cracking furnace.

In order to further understand the present disclosure, the preferred embodiments of the present disclosure will be described below in conjunction with examples. However, it should be understood that these descriptions are only for further illustrating the features and advantages of the present disclosure, rather than limiting the claims of the present disclosure.

Example 1

1.1 Formula of Raw Material for Brick Body

| | |
|---|---|
| 72 alumina crystal fiber | 20%; |
| Amorphous ceramic fiber | 20%; |
| Fine powder filler | 20%; |

-continued

| | |
|---|---|
| Inorganic binder - silica sol | 30%; |
| Organic binder - starch | 8%; |
| Flocculant - Polyaluminum Chloride | 2%; |

Among them:

The length combination of alumina crystal fiber was: 0.01~0.05 mm 30%, 0.05~0.1 mm 40%, 0.1~1 mm 30%.

The length combination of amorphous ceramic fiber high-aluminum blown fiber was: 0.01~0.05 mm 30%, 0.05~0.1 mm 40%, 0.1~1 mm 30%.

The fine powder filler was alumina fine powder, and the particle size combination was: 200~325 mesh 10%, 1000 mesh 10%.

1.2 Formula of Paint

| | |
|---|---|
| High-temperature resistant inorganic fiber | 15%; |
| High-temperature reinforcing filler - acicular microsilica powder | 10%; |
| High-temperature expansion filler - kyanite powder | 12%; |
| High-temperature skeleton filler - alumina powder | 10%; |
| Nanopowder - nano silica | 5%; |
| Inorganic binder - aluminum sol | 40%; |
| Organic additive - cellulose powder 2%, Biocide 0.7%, ethylene glycol 0.3% | 3%; |
| Inorganic suspending agent - bentonite | 5%; |

Water accounting for 15% of a total mass of all the above components.

Among them, the raw material fiber of high-temperature resistant inorganic fiber was high-alumina fiber, which was processed into short fiber. The obtained fiber had a length of 0.01~1 mm and a diameter of 1~5 um.

Preparation of Paint

The high-temperature resistant inorganic fiber was weighed out and added into a mixer. The inorganic binder and water were weighed out, added, and stirred for 20 min to fully wet and disperse the fibers. Then the high-temperature expansion filler, reinforcing filler, and skeleton filler were added in sequence. After the addition, the mixture was stirred for 5 min to fully disperse. Then the nanopowder was added and stirred for 5 min. The inorganic suspending agent was added and stirred for 10 min to fully expand to play a suspending role. Finally, the organic additives were added and stirred for 20 min to obtain the paint.

1.3 Preparation of Burner Brick

S1. Alumina crystal fiber and amorphous ceramic fiber of different lengths gradations, inorganic binder, fine powder filler and organic binder were added into water in proportions and mixed uniformly to obtain a slurry with a mass concentration of 5%.

S2. Flocculant was added to the slurry to flocculate other materials, until the water became clear to obtain a flocculated material.

S3. The flocculated material was put into the forming tank, and vacuum suction filtration was performed. After forming, the wet blank was pressed to a thickness of 350 mm and transported to a drying chamber for drying at a drying temperature of 120° C. and a time of 120 h to obtain a dry blank.

S4. The dry blank was cut to make the size and appearance regular, to obtain a dry blank with a length of 490 mm×a width of 480 mm×a height of 310 mm.

S5. The surface of the dry blank was applied with paint, and the specific steps are as follows: punching holes on the surface of the dry blank→rooting of the paint→applying on the surface of the dry blank→drying. Among them, the hole diameter was 10 mm and the depth was 30 mm. The coating thickness was 10 mm; the drying temperature was 120° C. and the time was 24 h. After the above treatment, a burner brick was obtained.

Example 2

1.1 Formula of Raw Material for Brick Body

| | |
|---|---|
| 80 alumina crystal fiber | 25%; |
| Amorphous ceramic fiber | 5%; |
| Fine powder filler | 25%; |
| Inorganic binder - silica sol | 35% |
| Organic binder - starch | 7%; |
| Flocculant - Polyaluminum Chloride | 3%; |

Among them:

The length combination of alumina crystal fiber was: 0.01~0.05 mm 30%, 0.05~0.1 mm 40%, 0.1~1 mm 30%.

The length combination of amorphous ceramic fiber high-aluminum blown fiber was: 0.01~0.05 mm 30%, 0.05~0.1 mm 40%, 0.1~1 mm 30%.

The fine powder filler was alumina fine powder, and the particle size combination was: 200~325 mesh 15%, 1000 mesh 10%.

1.2 Formula of Paint

| | |
|---|---|
| High-temperature resistant inorganic fiber | 20%; |
| High-temperature reinforcing filler - pyrophyllite powder | 13%; |
| High-temperature expansion filler - sillimanite | 5%; |
| High-temperature skeleton filler - mullite powder | 15%; |
| Nanopowder - nano alumina powder | 3%; |
| Inorganic binder - silica sol | 41%; |
| Organic additive - starch powder 2%, Biocide 0.7%, ethylene glycol 0.3% | 3%; |

Water accounting for 25% of a total mass of all the above components.

Among them, the raw material fiber of high-temperature resistant inorganic fiber was zirconium-containing fiber, which was processed into short fiber. The obtained fiber had a length of 0.011 mm and a diameter of 2~6 um.

Preparation of painting: The same as in Example 1.

1.3 Preparation of burner brick: The same as in Example 1.

Example 3

1.1 Formula of Raw Material for Brick Body

| | |
|---|---|
| 80 alumina crystal fiber | 30%; |
| Amorphous ceramic fiber | 5%; |
| Fine powder filler | 20%; |
| Inorganic binder - silica sol | 35%; |

| | |
|---|---|
| Organic binder - starch | 5%; |
| Flocculant - Polyaluminum Chloride | 5%; |

Among them:

The length combination of alumina crystal fiber was: 0.01~0.05 mm 30%, 0.05~0.1 mm 40%, 0.1~1 mm 30%.

The length combination of amorphous ceramic fiber high-aluminum blown fiber was: 0.01~0.05 mm 30%, 0.05~0.1 mm 40%, 0.1~1 mm 30%.

The fine powder filler was alumina fine powder, and the particle size combination was: 200~325 mesh 10%, 1000 mesh 10%.

1.2 Formula of Paint

| | |
|---|---|
| High-temperature resistant inorganic fiber | 25%; |
| High-temperature reinforcing filler - acicular microsilica powder | 15%; |
| High-temperature expansion filler - kyanite powder | 8%; |
| High-temperature skeleton filler - zircon powder | 7%; |
| Nanopowder - nano alumina powder | 5%; |
| Inorganic binder - liquid aluminum dihydrogen phosphate | 37%; |
| Organic additive - dextrin powder 2%, Biocide 0.7%, ethylene glycol 0.3% | 3%; |

Water accounting for 30% of a total mass of all the above components.

Among them, the raw material fiber of high-temperature resistant inorganic fiber was 72 alumina crystal fiber, which was processed into short fiber. The obtained fiber had a length of 0.01~1 mm and a diameter of 3~6 um.

Preparation of painting: The same as in Example 1.

1.3 Preparation of Burner Brick: The Same as in Example 1.

Example 4

1.1 Formula of Raw Material for Brick Body

| | |
|---|---|
| 80 alumina crystal fiber | 20%; |
| Amorphous ceramic fiber | 10%; |
| Fine powder filler | 20%; |
| Inorganic binder - silica sol | 40%; |
| Organic binder - starch | 6%; |
| Flocculant - Polyaluminum Chloride | 4%; |

Among them:

The length combination of alumina crystal fiber was: 0.01~0.05 mm 30%, 0.05~0.1 mm 40%, 0.1~1 mm 30%.

The length combination of amorphous ceramic fiber high-aluminum blown fiber was: 0.0~10.05 mm 30%, 0.05~0.1 mm 40%, 0.1~1 mm 30%.

The fine powder filler was alumina fine powder, and the particle size combination was: 200~325 mesh 10%, 1000 mesh 10%.

1.2 Formula of Paint

| | |
|---|---|
| High-temperature resistant inorganic fiber | 30%; |
| High-temperature reinforcing filler - pyrophyllite powder | 20%; |
| High-temperature expansion filler - sillimanite | 5%; |
| High-temperature skeleton filler - corundum powder | 7%; |
| Nanopowder - nano alumina powder | 8%; |
| Inorganic binder - aluminum sol | 25%; |

Organic additive—cellulose powder 3.5%, Biocide 1%, ethylene glycol 0.5% 5%;

Water accounting for 35% of a total mass of all the above components.

Among them, the raw material fiber of high-temperature resistant inorganic fiber was 95 alumina crystal fiber, which was processed into short fiber. The obtained fiber had a length of 0.01~1 mm and a diameter of 3~6 um.

Preparation of painting: The same as in Example 1.

1.3 Preparation of Burner Brick: The Same as in Example 1.

Example 5

The performance of the burner bricks obtained in Examples 1~4 was tested, and the full-fiber burner brick product in the prior art (provided by Unifrax Co., Ltd.) was used as a control sample for performance comparison. The results are shown in Table 1:

TABLE 1

Burner brick performance of Examples 1-4

| | Rupture strength at room temperature MPa | Compressive strength at room temperature (Compression 10%) MPa | Compressive strength after firing, 1350° C. × 3 h (Compression 10%) MPa | Heating linear variable 1350° C. × 3 h % |
|---|---|---|---|---|
| Example 1 | 1.17 | 0.6 | 0.773 | +0.2 |
| Example 2 | 1.10 | 0.65 | 0.85 | +0.3 |
| Example 3 | 1.15 | 0.70 | 0.80 | +0.5 |
| Example 4 | 1.2 | 0.75 | 0.95 | +0.8 |
| Control sample | 0.93 | 0.38 | 0.682 | −2.4 |

It can be seen from the above test results that, compared with the existing full-fiber burner brick, the burner brick provided by the present disclosure can significantly improve the rupture strength and compressive strength at room temperature, and compressive strength at high temperature, and decrease the heating linear variable, greatly improving the burner brick performance.

The above description of the examples is only used to facilitate understanding of the method and core concept of the present disclosure. Various modifications to the embodiments are apparent for the skilled in the art. The general principle defined herein may be implemented in other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A full-fiber burner brick, comprising a full-fiber brick body and a coating coated on surface of the full-fiber brick body;

the full-fiber brick body is prepared from a raw material including the following components in mass ratio:

| | |
|---|---|
| alumina crystal fiber | 20%~50%; |
| amorphous ceramic fiber | 5%~20%; |
| fine powder filler | 20%~50%; |

-continued

| | |
|---|---|
| inorganic binder | 30%~50%; |
| organic binder | 5%~15%; |
| flocculant | 1%~5%; | the alumina crystal fiber is composed of a combination of fibers of different lengths, and mass ratio of the fibers of different lengths in the alumina crystal fiber is:

| | |
|---|---|
| 0.01 mm ≤ length < 0.05 mm | 25%~35%; |
| 0.05 mm ≤ length < 0.1 mm | 35%~45%; |
| 0.1 mm ≤ length < 1 mm | 25%~35%; | the amorphous ceramic fiber is composed of a combination of fibers of different lengths, and mass ratio of the fibers of different lengths in the amorphous ceramic fiber is:

| | |
|---|---|
| 0.01 mm ≤ length < 0.05 mm | 25%~35%; |
| 0.05 mm ≤ length < 0.1 mm | 35%~45%; |
| 0.1 mm ≤ length < 1 mm | 25%~35%; | the coating is formed by a paint comprising the following components in mass ratio:

| | |
|---|---|
| high-temperature resistant inorganic fiber | 10%~50%; |
| reinforcing filler | 10%~20%; |
| high-temperature expansion filler | 5%~15%; |
| skeleton filler | 7%~30%; |
| nanopowder | 3%~10%; |
| inorganic suspending agent | 0%~20%; |
| inorganic binder | 10%~50%; |
| organic additive | 3%~15%; | and
water accounting for 10%~50% of a total mass of all the above components;
a length of the high-temperature resistant inorganic fiber is 0.01~1 mm;
the reinforcing filler is selected from one or more of acicular microsilica powder and pyrophyllite powder;
the high-temperature expansion filler is selected from one or more of kyanite powder and sillimanite;
the skeleton filler is selected from one or more of mullite powder and zircon powder;
the nanopowder is selected from one or more of nano silica and nano alumina powder;
the inorganic suspending agent is bentonite.

2. The burner brick according to claim 1, wherein the fine powder filler is alumina fine powder;
the fine powder filler is composed of particles of different particle sizes, and mass ratio of the fine powder filler of different particle sizes in the raw material is:

| | |
|---|---|
| 200-325 mesh filler | 10%~20%; |
| 1000 mesh filler | 10%~30%. |

3. The burner brick according to claim 1, wherein the inorganic binder is silica sol and/or aluminum sol;
the organic binder is starch.

4. The burner brick according to claim 1, wherein the flocculant is polyaluminum chloride;
a thickness of the full-fiber brick body is 250~550 mm;
a thickness of the coating is 5~10 mm.

5. The burner brick according to claim 1, wherein in the paint:
the high-temperature resistant inorganic fiber is selected from one or more of high-aluminum fiber, zirconium-containing fiber and alumina crystal fiber.

6. The burner brick according to claim 1, wherein in the paint:
the inorganic binder is selected from one or more of aluminum sol, aluminum dihydrogen phosphate and silica sol;
the organic additive is selected from one or more of an organic binder, an antiseptic and an antifreeze agent.

7. A method for preparing the full-fiber burner brick according to claim 1, comprising:
a) mixing alumina crystal fiber, amorphous ceramic fiber, inorganic binder, fine powder filler, organic binder and water to obtain a slurry;
b) mixing the slurry with flocculant, and then performing vacuum suction filtration and pressing to obtain a wet blank;
c) drying the wet blank to obtain a dry blank; and
d) applying paint to surface of the dry blank and drying to obtain a full-fiber burner brick.

8. The method according to claim 7, wherein in the step a), a mass concentration of the slurry is 1%~15%;
in the step b), the pressing is such that a thickness of a blank reaches 250~550 mm.

* * * * *